Dec. 16, 1941.  B. R. BENJAMIN  2,266,583
PLOW BOTTOM
Filed May 25, 1939
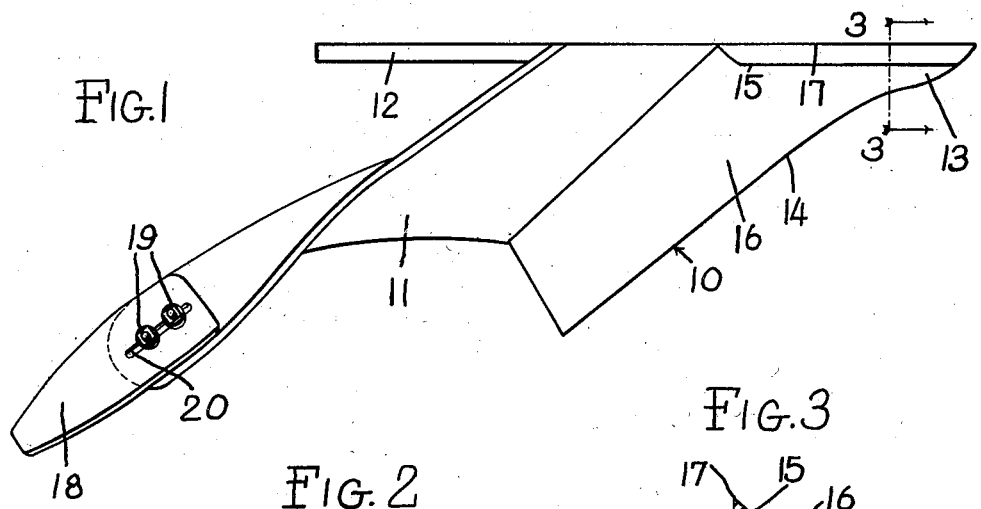
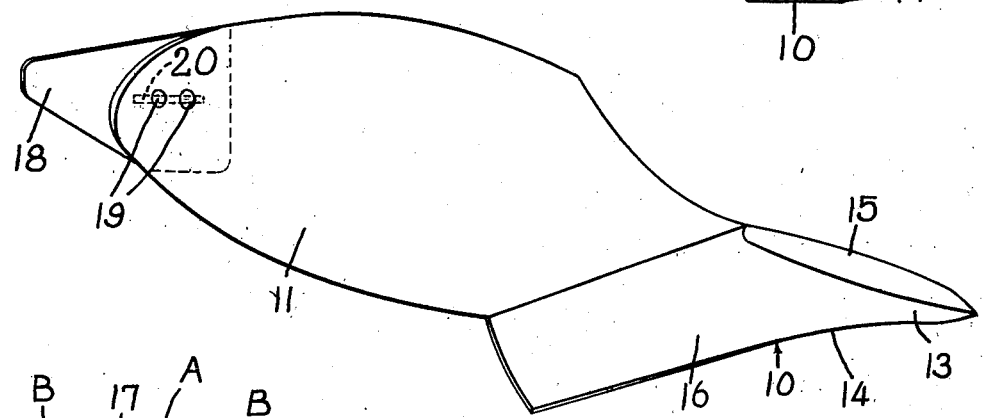
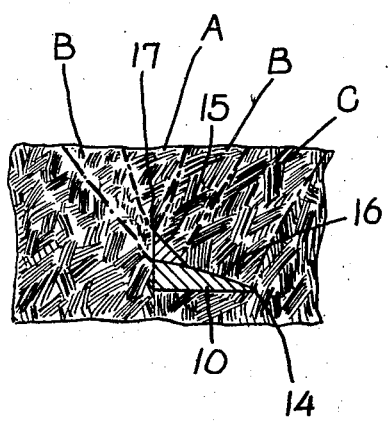
INVENTOR
B. R. BENJAMIN
BY Paul O. Pippel
ATT'Y.

Patented Dec. 16, 1941

2,266,583

UNITED STATES PATENT OFFICE 2,266,583

PLOW BOTTOM

Bert R. Benjamin, Oak Park, Ill., assignor to International Harvester Company, a corporation of New Jersey Application May 25, 1939, Serial No. 275,629

3 Claims. (Cl. 97—125)

This invention relates to a plow bottom and more particularly to a plow bottom of the type adapted to be used in plowing at higher speeds than that at which plowing is ordinarily done.

In all plow bottoms in general, and in so-called "high-speed" plows in particular, considerable difficulty is experienced during operation of the plow in mucky soil. According to the present invention, this difficulty is overcome by the provision of an improved point on the share part of the plow bottom. In ordinary constructions, the upper surface of the share part is comparatively flat and the tendency of the point in working the soil is to slice out comparatively large slabs of soil. This is especially true when the soil is not easily broken by the plow bottom, and it thus becomes necessary to decrease the plowing speed. Where plow bottoms of the ordinary type are used, in which the moldboard curvature is curved about a substantially short radius, the aforesaid large slabs cut out by the ordinary point are thrown heavily against the moldboard and the draft on the plow bottom is increased to a considerable extent. Substantially the same difficulty is experienced in those cases where the plow bottom is of the "high-speed" type; that is, in which the curvature of the moldboard is formed about a comparatively greater radius. As is well known to those skilled in the art, these types of plows are particularly adapted to the higher plowing speeds obtained in pneumatic tire-equipped tractors, and the general principle of such bottoms is that the moldboard curvature is extended substantially rearwardly furrow-wise so that the rearward portion of the moldboard curves a shorter distance away from the land side of the furrow.

The present invention contemplates and has for its principal object the provision of an improved point in either of the aforesaid types of plow bottoms and especially in a plow bottom of the "high-speed" type, the improved point comprising a reenforcing breaker element formed integrally with or otherwise rigidly carried by the share along its land side, the element extending rearwardly from the point substantially to the junction between the share and the moldboard. This strip is preferably triangular in cross-section and the apex of the triangle is disposed upwardly and furrow-wise along the upper surface of the share. The provision of this reenforcing breaker element enables the plow share to be drawn to a finer point, the function of the improved point being to break up or reduce the soil to smaller fragments, resulting in easier plowing, less interference with the moldboard, and, consequently, maintenance of high plowing speeds.

A further object of the invention is the provision of a moldboard extension wing which is secured to the rearward portion of the moldboard for increasing the curvature of the moldboard away from the land side of the bottom. This provision is included for the purpose of interrupting the rearward travel on the finer soil fragments as displaced by the point when the bottom is forming a furrow. At high speed operation of the bottom, this extension member serves to direct the soil fragments toward the side of the furrow and prevents such fragments from being thrown crosswise from the furrow and into the adjacent furrows. The extension serves also in preventing the fragments from falling behind the moldboard and into the furrow when the plowing speed is decreased, or when the plowing speed is generally slower, as during the use of a "slow-speed" bottom.

These and other important objects will appear more fully from the following detailed description taken in conjunction with the accompanying sheet of drawings, in which:

Figure 1 is a plan elevational view of a plow bottom embodying the improved point and extension member;

Figure 2 is a perspective view of the same;

Figure 3 is a transverse sectional view of the point and share structure as viewed along the line 3—3 of Figure 1; and, Figure 4 is a transverse sectional view generally indicating the position and function of the improved point structure in the soil.

The particular type of plow bottom chosen for the purpose of illustration is that commonly known as a high speed bottom, but which is generaly similar to an ordinary plow bottom, including a share part 10 which rigidly carries rearwardly thereof a moldboard 11. A landside 12 completes the general plow structure. The share 10 is drawn at its forward end to a point 13, the share being thereby provided with a lateral cutting edge 14 extending rearwardly and substantially furrow-wise from the point. The point in the present instance is drawn considerably finer than the blunt point ordinarily found in prior bottoms, the finer point being permitted because of the improved point structure provided by the present invention. The improved structure includes a reenforcing breaking element or member 15 rigidly carried by the share at its upper surface and preferably along the land side thereof. This element extends rearwardly from the point 13 substantially to the junction between the moldboard 11 and the share 10. As best shown in Figure 3, this element is generally triangular in cross-section having the line through its apex disposed furrow-wise along the land side of the share and above the upper surface of the share 10. The upper surface of the share is generally flat as at 16 being interrupted along its land side by the element 15, the furrow-wise apex edge of the element forming an upper cutting edge 17 which cooperates with the lateral cutting edge 14 of the share to enable the plow to be more easily drawn through the soil. The inclined surface of the element 15 lies in a plane forming with the upper surface 16 of the share an obtuse dihedral angle of substantially 150 degrees, as best shown in Figure 4. The provision particularly enables the attainment of higher plowing speeds without materially increasing the draft on the plow.

The breaking and reducing action of the improved point is indicated generally in Figure 4. The soil fragment A directly above the cutting edge 17 is that fragment first cut out by the point; and, as the point procedes further in forming the furrow, other fragmentary soil portions B are cut out. As the bottom continues to penetrate the soil along the furrow, the upper flat surface 16 slices or cuts out further portions as at C. It will be noted that the general result is that numerous smaller soil fragments are broken or cut out rather than a single or a few large slabs.

It is further desirable in a plow of this type to provide an extension at the rearward portion of the moldboard. This extension in the present instance takes the form of a rearwardly extending wing member 18 adjustably secured to the rearward portion of the moldboard 11 by a pair of bolts 19 which cooperate with slots 20 in the wing member. The wing member increases the curved extent of the moldboard in a direction away from the land side of the bottom. The provision of this wing member is desirable for the purpose of interrupting the rearward travel of the finer soil fragments as they are displaced rearwardly by the breaking action of the improved point structure 13. The provision of the wing member is especially desirable since the smaller soil fragments are more easily displaced rearwardly; the absence of the extension member at high speeds would permit these fragments to be thrown transversely of the furrow and into the adjacent furrow. The extension member 18 serves to retard this rearward travel of and to lay the soil along the edge of the furrow.

During operation of the bottom at slow speeds, necessitated under certain conditions—or generally, because of the use of a "slow-speed" bottom—the absence of the extension member would permit the soil fragments to become lodged behind the bottom and in the furrow.

From the foregoing description, it will be seen that an improved plow bottom structure has been provided incorporating generally an improved point structure and a wing extension structure for the purpose of attaining the objects hereinbefore set forth. It will be understood, of course, that various alterations and modifications may be made in the particular structure illustrated without departing from the spirit and scope of the appended claims.

What is claimed is:

1. A plow bottom comprising a share having a substantially flat upper surface and terminating in a point, a moldboard associated with the share at a rearward portion thereof, and a breaker element rigidly carried by the share at its upper surface and extending furrow-wise along the land-side of the share, said element being substantially triangular in cross-section to provide an upper share surface having portions lying respectively in two planes disposed to form an obtuse angle of substantially 150 degrees, the apex of said element being disposed substantially along a line extended through the vertical plane of the land-side of the share.

2. A plow bottom comprising a share having a substantially flat upper surface and terminating in a point, a moldboard associated with the share at a rearward portion thereof, and a breaker element rigidly associated with the share and being disposed furrow-wise from the point along the upper surface of the share at the land-side thereof, said element diverging rearwardly from the point, said element including a side inclined upwardly from the share and toward the land-side thereof at an obtuse angle of substantially 150 degrees to the upper surface of the share.

3. A plow bottom comprising a share and a moldboard associated at a rearward portion thereof, said share having a substantially flat upper surface and at its forward end terminating in an extremely narrow point, and a reenforcing element rigidly carried by the share at the upper surface thereof, said element extending from the point substantially furrow-wise along the land-side of the share, said element tapering rearwardly from the point and upwardly at an obtuse angle of substantially 150 degrees from the share upper surface to provide in conjunction with the share point a point having a lateral and an upper cutting edge.

BERT R. BENJAMIN.